`US009350833B2`

United States Patent
Li et al.

(10) Patent No.: US 9,350,833 B2
(45) Date of Patent: May 24, 2016

(54) ELECTRONIC DEVICE AND TRAY UNIT THEREOF

(71) Applicant: HTC Corporation, Taoyuan, Taoyuan County (TW)

(72) Inventors: Ching-Ho Li, Taoyuan (TW);
Wen-Sheng Hsu, Taoyuan (TW);
Fu-Chung Hsieh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 82 days.

(21) Appl. No.: 14/460,820

(22) Filed: Aug. 15, 2014

(65) Prior Publication Data
US 2016/0050783 A1    Feb. 18, 2016

(51) Int. Cl.
*G06F 1/16* (2006.01)
*H04M 1/02* (2006.01)

(52) U.S. Cl.
CPC ........... *H04M 1/0202* (2013.01); *G06F 1/1613* (2013.01)

(58) Field of Classification Search
CPC ................. H04M 1/026; H04B 2001/3894
USPC .................................................. 361/679.32
See application file for complete search history.

(56) References Cited

U.S. PATENT DOCUMENTS

| 7,355,845 | B2* | 4/2008 | Kim ................... B60R 11/0258 361/679.33 |
| 8,145,261 | B2 | 3/2012 | Wang et al. |
| 8,376,764 | B1* | 2/2013 | Su ..................... G06K 13/0831 439/157 |
| 9,125,316 | B2* | 9/2015 | Hsu ...................... H04B 1/3816 |
| 2002/0119697 | A1* | 8/2002 | Chan ................. H01R 13/5213 439/519 |
| 2003/0073350 | A1* | 4/2003 | Shimada .............. H01R 13/453 439/630 |
| 2010/0264671 | A1* | 10/2010 | Zuo ..................... H04M 1/0274 292/57 |
| 2012/0307451 | A1* | 12/2012 | Shukla ............... G06K 13/0831 361/699 |
| 2013/0237086 | A1 | 9/2013 | Chang et al. |
| 2015/0022981 | A1* | 1/2015 | Tan ..................... G06K 7/0021 361/756 |

* cited by examiner

*Primary Examiner* — Anthony Q Edwards
(74) *Attorney, Agent, or Firm* — Birch, Stewart, Kolasch & Birch, LLP (57) ABSTRACT

An electronic device includes a main body, a slot formed on a side of the main body, and a tray unit received in the slot. The tray unit includes a cover, a supporting base, a shaft, and a waterproof member. The supporting base is configured to receive an external card. The shaft pivotally connects the cover with the supporting base, and the supporting base is rotatable with respect to the cover along the shaft. The waterproof member is disposed on the cover. When the tray unit is received in the slot, the waterproof member abuts the main body of the electronic device.

16 Claims, 7 Drawing Sheets

ELECTRONIC DEVICE AND TRAY UNIT THEREOF

BACKGROUND OF THE INVENTION

1. Field of the Invention

The present application relates to an electronic device, and in particular to an electronic device having a tray unit.

2. Description of the Related Art

With the development of technology, today's electronic devices usually have at least one slot disposed on a side thereof, such that a tray unit for receiving an external card, such as Subscriber Identity Module (SIM) card or expanded memory card (e.g. SD card) can be placed into the electronic device through the slot. Moreover, in order to use a waterproof model, the tray unit is generally assembled with an extra waterproof member.

Figure 5:
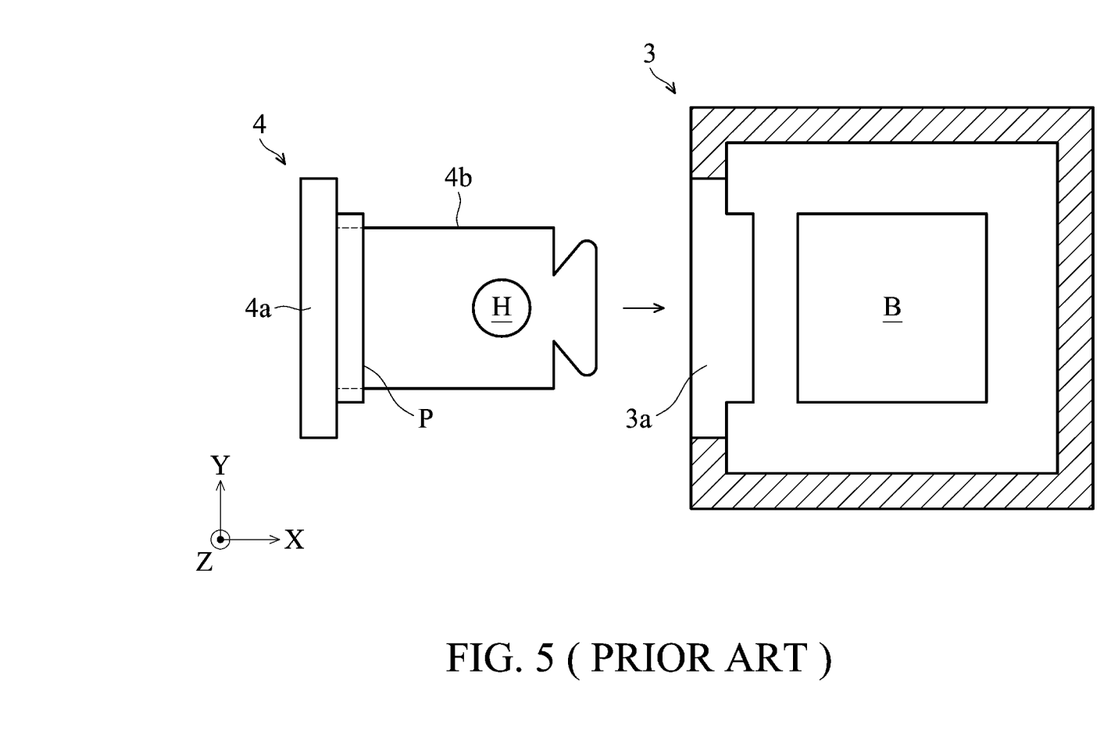
FIG. 5 shows a schematic view of a conventional electronic device and a tray unit thereof.

Referring to FIG. 5, a conventional tray unit 4 primarily includes a cover 4a, a supporting base 4b integrally formed with the cover 4a, and a waterproof member P. The waterproof member P is fit on the supporting base 4b and abuts the cover 4a. When the tray unit 4 supporting an external card (not shown) is placed into an electronic device 3 through a slot 3a formed on a side of the electronic device 3, the external card can be electrically connected to a circuit board B in the electronic device 3 through an opening H formed on the supporting base 4b. The cover 4a and the waterproof member P can be tightly jointed with the casing of the electronic device 3, thus achieving the effect of water resistance.

However, when the cover 4a and the waterproof member P are tightly jointed with the casing of the electronic device 3, a tolerance between the tray unit 4 and the circuit board B is easily caused (for example, a displacement of the tray unit 4 along the Z-axis may happen). Consequently, the SIM card or SD card received in the tray unit 4 cannot be electrically connected with the metal contact/connector on the circuit board B successfully, thus loosing contact therebetween. Therefore, it is important to design an electronic device and a tray unit that are water resistant and can effectively improve loose contact between the external card and the connector.

BRIEF SUMMARY OF THE INVENTION

An embodiment of the invention provides a tray unit, movably connected with a main body of an electronic device. The tray unit includes a cover; a supporting base configured to receive an external card; a shaft pivotally connecting the cover with the supporting base, wherein the supporting base is rotatable with respect to the cover along the shaft; and a waterproof member disposed on the cover, wherein when the tray unit is combined with the main body of the electronic device, the waterproof member abuts the main body.

Another embodiment of the invention provides an electronic device, including a main body; a slot formed on a side of the main body; and a tray unit received in the slot. The tray unit includes a cover; a supporting base configured to receive an external card; a shaft pivotally connecting the cover with the supporting base, wherein the supporting base is rotatable with respect to the cover along the shaft; and a waterproof member disposed on the cover, wherein when the tray unit is received in the slot, the waterproof member abuts the main body.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1:
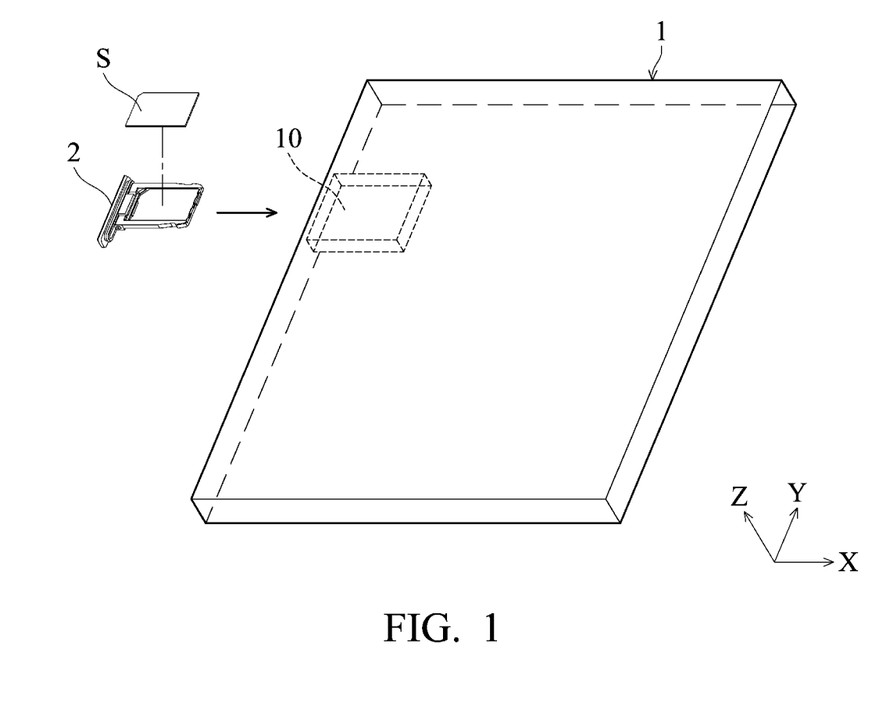
FIG. 1 shows a schematic view of an electronic device according to an embodiment of the invention.

FIG. 1 shows a schematic view of an electronic device according to an embodiment of the invention. For example, the electronic device may be a smart phone, a tablet computer, or a notebook computer. As shown in FIG. 1, the electronic device primarily includes a main body 1 and a tray unit 2, wherein a side of the main body 1 forms at least a slot 10, and the tray unit 2 is configured to receive an external card S, such as a SIM card or SD card. When the tray unit 2 is placed into the slot 10 in the direction of the arrow shown in FIG. 1, the external card S can be electrically connected to, for example, electrical contacts (not shown) disposed on a lower side of the slot 10. In some embodiments of the invention, the main body 1 may also include a circuit board in the interior, wherein the external card S can be electrically connected to the circuit board through the contacts in the slot 10.

Figure 2:
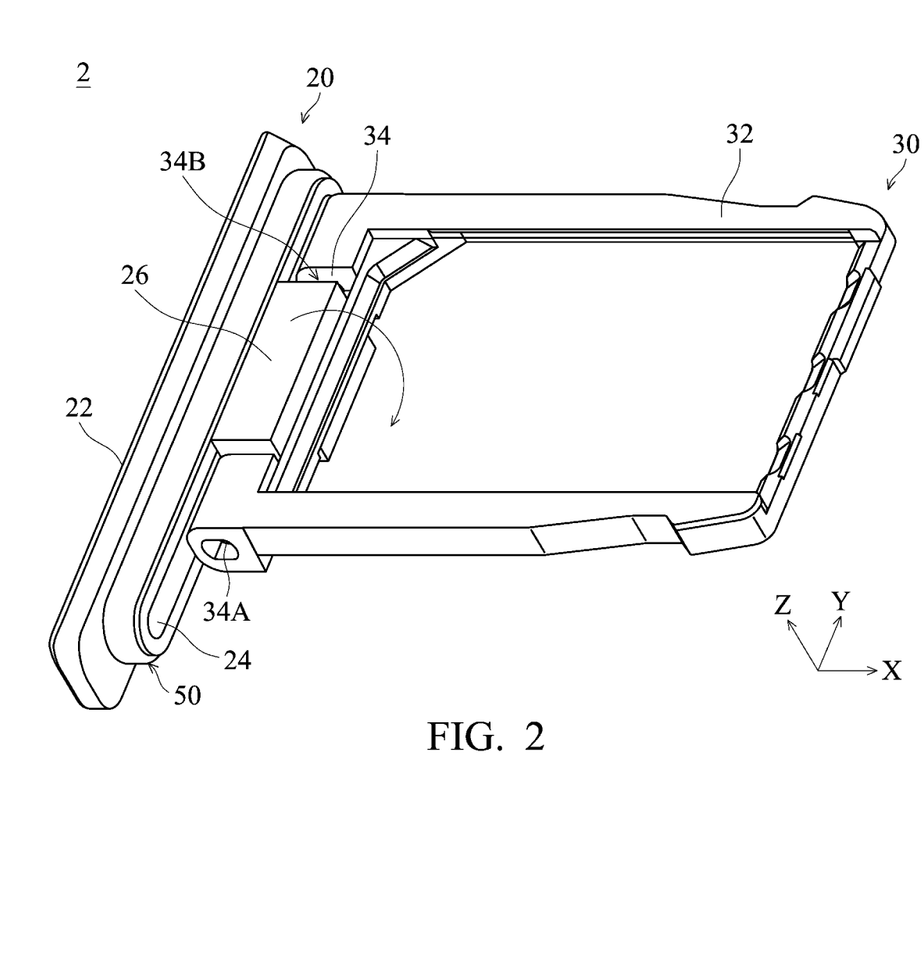
FIG. 2 shows a schematic view of a tray unit according to an embodiment of the invention.
Figure 3A:
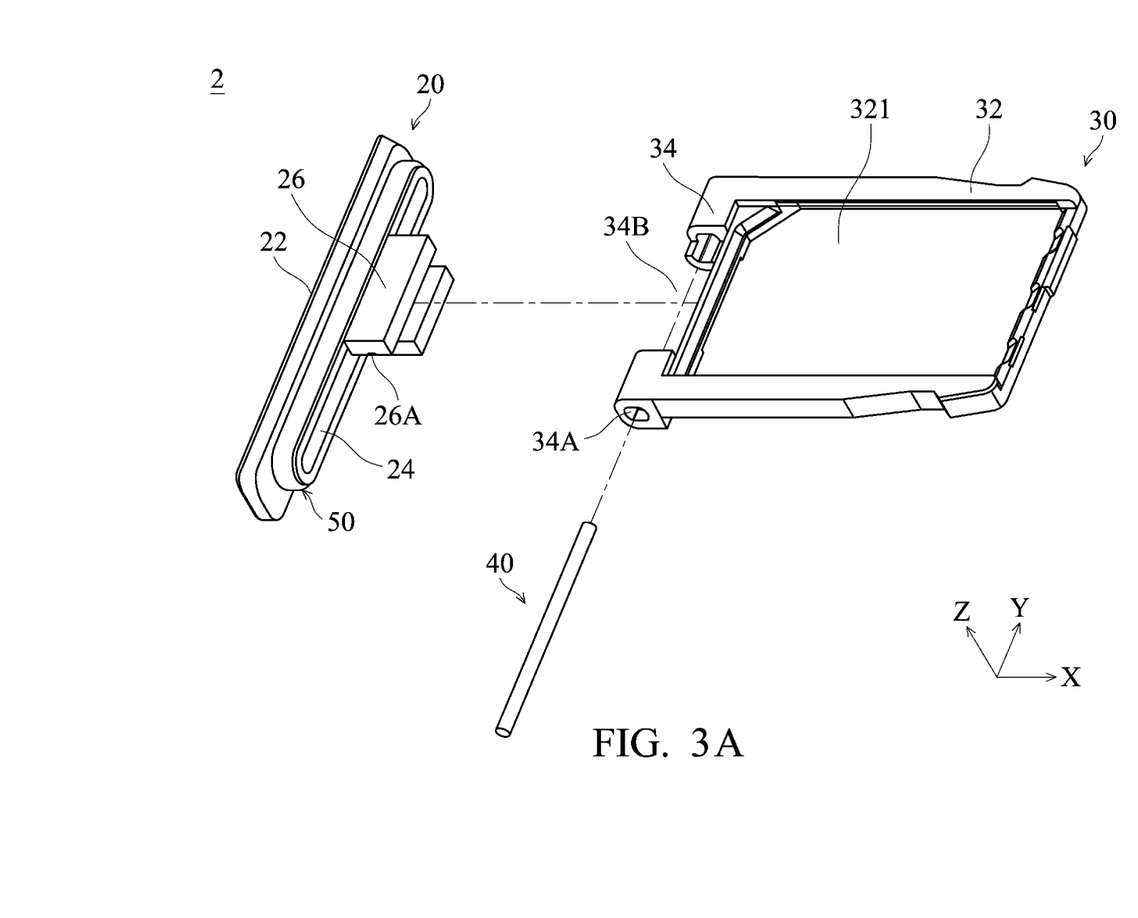
FIG. 3A shows an exploded diagram of the tray unit in FIG. 2.

FIG. 2 shows a schematic view of a tray unit 2 according to an embodiment of the invention. FIG. 3A shows an exploded diagram of the tray unit 2 in FIG. 2. As shown in FIG. 3A, the tray unit 2 includes a cover 20, a supporting base 30, a shaft 40, and a waterproof member 50.

Figure 3B:
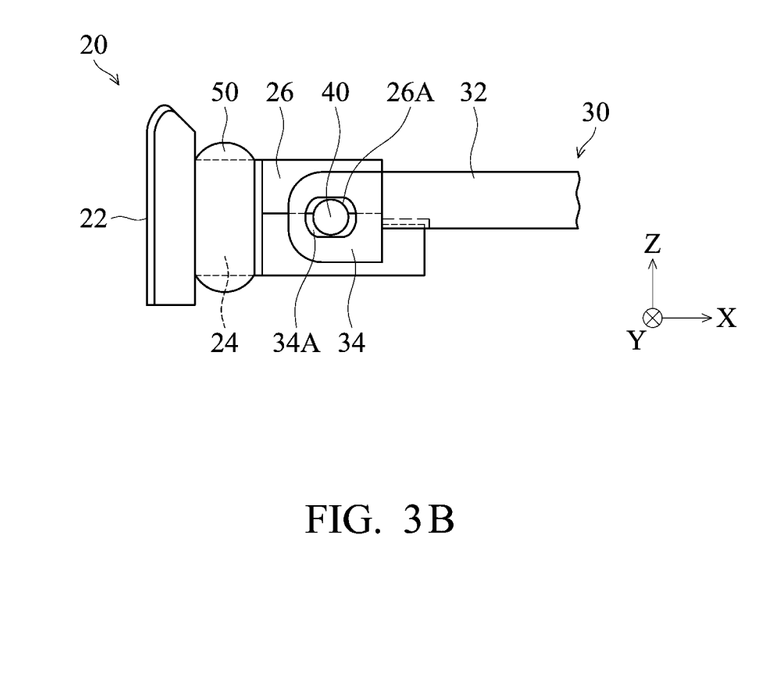
FIG. 3B shows a side view illustrating the cover, the waterproof member, and the supporting base in FIG. 3A after being assembled.

In this embodiment, the cover 20 includes a protective portion 22, a connection portion 24, and a first pivoting portion 26 connected with each other. The protective portion 22 and the connection portion 24 are substantially elongated shaped and are extended along the Y-axis, respectively. The first pivoting portion 26 has a ladder-shaped structure (FIG. 3A and FIG. 3B) and forms a first shaft hole 26A extended along the Y-axis. As shown in FIGS. 2, 3A, and 3B, the connection portion 24 is positioned between the protective portion 22 and the first pivoting portion 26, and the first pivoting portion 26 protrudes from the connection portion 24 toward the supporting base 30. In this embodiment, the protective portion 22, the connection portion 24, and the first pivoting portion 26 of the cover 20 are integrally formed in one piece and comprise plastic material.

The waterproof member 50 is fit on the connection portion 24 of the cover 20, wherein two ends of the connection portion 24 are arc-shaped (FIG. 3A). In this embodiment, the waterproof member 50 comprises rubber material (e.g. a rubber ring). When the tray unit 2 is placed into the slot 10 of the main body 1 of the electronic device, the tray unit 2 can be engaged with a clamping structure (not shown in FIG. 1) in the slot 10, and a pulling force toward the interior of the slot 10 is exerted on the tray unit 2. In this state, the waterproof member 50 fixed with the connection portion 24 tightly abuts the main body 1, and the protective portion 22 of the cover 20 is exposed to a side of the main body 1, such that the effect of water resistance is achieved.

Still referring to FIG. 3A, the supporting base 30 includes a receiving portion 32 and a second pivoting portion 34. The receiving portion 32 is substantially rectangular shaped with a hollow for supporting the external card S (FIG. 1), and the external card S can be electrically connected to the contacts in the slot 10 through an opening 321 on the receiving portion 32. The second pivoting portion 34 is formed on a side of the receiving portion 32 adjacent to the cover 20, and has a second shaft hole 34A extended along the Y-axis and a recess 34B. The recess 34B is depressed toward the receiving portion 32 (X-axis) and configured to receive the first pivoting portion 26 of the cover 20. Accordingly, the first pivoting portion 26 is pivotally connected to the second pivoting portion 34 with the shaft 40 passing through the first shaft hole 26A and the second shaft hole 34A along an extension direction (Y-axis) of a side of the supporting base 30 (FIG. 3A and FIG. 3B), and thus the supporting base 30 can be rotated downward with respect to the cover 20 (as the arrow in FIG. 2 indicates). In this embodiment, the receiving portion 32 and the second pivoting portion 34 of the supporting base 30 are integrally formed in one piece and comprise metal material, and the shaft 40 may be a metal shaft. However, the invention is not limited to this embodiment.

It should be noted that the supporting base 30 and the cover 20 are connected by the shaft 40 and are rotatable with each other by a certain degree. Specifically, a downward rotation angle of the supporting base 30 with respect to the cover 20 is restricted by the ladder-shaped structure of the first pivoting portion 26 (referring to FIGS. 2 and 3B, when the supporting base 30 is rotated downward by a certain degree, it may contact against a protrusion on a lower side of the ladder-shaped structure and thus cannot be further rotated). Thus, the external card S received in the supporting base 30 can be stably connected to the contacts in the slot 10, such that loose contact between the external card S in the unit tray 2 and the connector (contacts on the lower side of the slot 10), which is caused by the tolerance between elements in the conventional device and tray unit thereof, is improved. Consequently, the stability of signal transmission is enhanced. Moreover, since the waterproof member 50 is merely fixed with the connection portion 24 of the cover 20 rather than connected to the shaft 40 and the supporting base 30, the rotation of the supporting base 30 around the shaft 40 is not adversely affected.

Figure 3C:
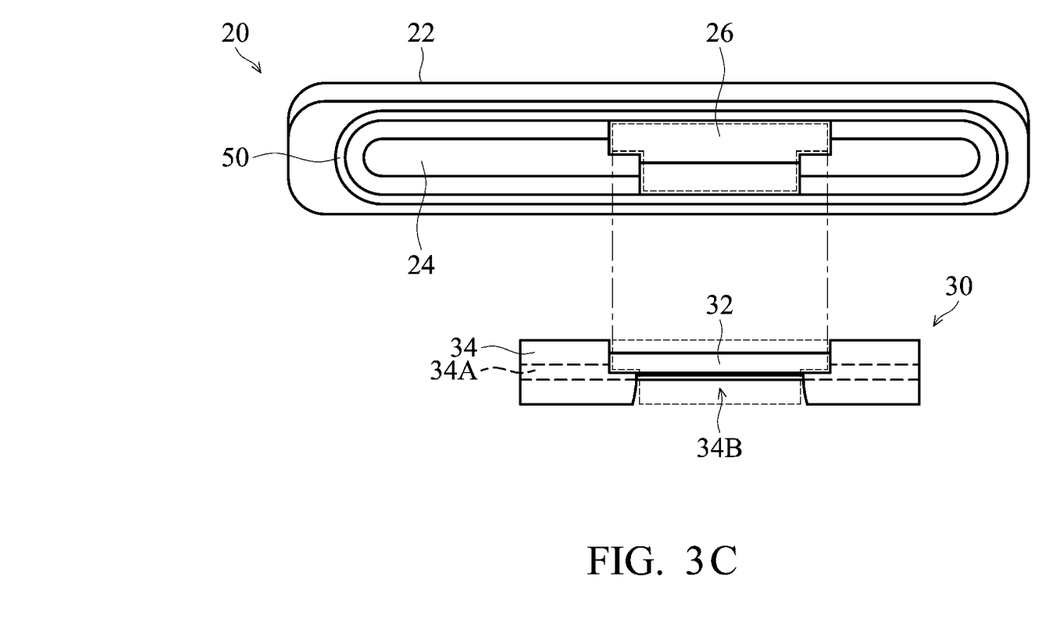
FIG. 3C shows a schematic view illustrating the first pivoting portion of the cover engaged with the recess of the second pivoting portion of the supporting base.

Referring to FIG. 3C, in this embodiment, the first pivoting portion 26 of the cover 20 and the recess 34B of the second pivoting portion 34 of the supporting base 30 further have corresponding shapes. For example, the first pivoting portion 26 has a T-shaped cross section, and the recess 34B has a corresponding T-shaped cross section. Therefore, the first pivoting portion 26 can be engaged with the recess 34B (as per the assembly method indicated by the dotted line in FIG. 3C) and a relative slide between the cover 20 and the supporting base 30 along a horizontal direction is prevented, thus enhancing the contact stability between the external card S and the contacts in the slot 10.

Figure 4:
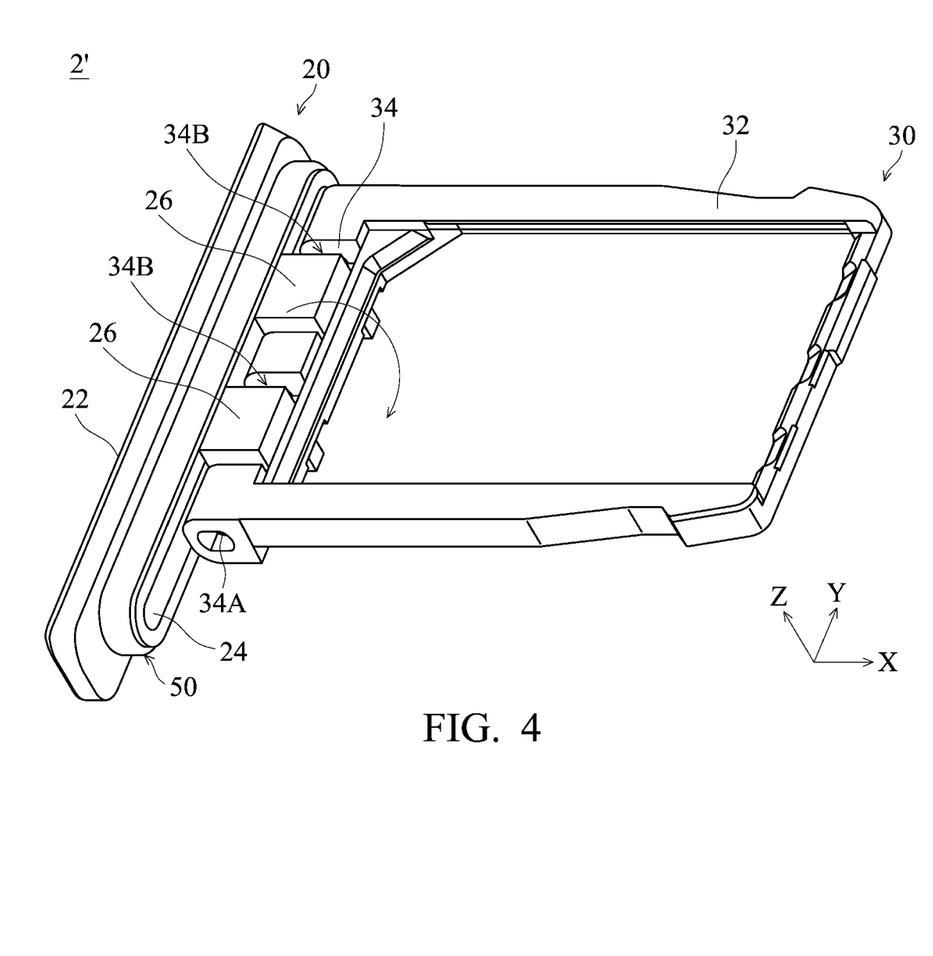
FIG. 4 shows a schematic view of a tray unit according to another embodiment of the invention.

FIG. 4 shows a schematic view of a tray unit 2' according to another embodiment of the invention. The differences between the unit tray 2' in FIG. 4 and the tray unit 2 in FIG. 2 are that the cover 20 of the tray unit 2' further includes a plurality of first pivoting portions 26 and the second pivoting portion 34 of the supporting base 30 further forms a plurality of recesses 34B for receiving the plurality of first pivoting portions 26, correspondingly. With the shaft 40 passing through the first pivoting portions 26 and the second pivoting portion 34, the supporting base 30 can also be rotated downward with respect to the cover 20 (as the arrow in FIG. 4 indicates), thus improving loose contact between the external card in the tray unit 2' and the connector (contacts on the lower side of the slot 10), which is because of the tolerance between elements in the conventional device and tray unit thereof.

As described above, the invention provides an electronic device and a tray unit thereof. In particular, with the shaft pivotally connecting the cover with the supporting base, the supporting base is rotatable with respect to the cover, such that loose contact between the external card in the unit tray and the connector in the electronic device, which is caused by the tolerance between elements in the conventional device and tray unit thereof, is improved. Consequently, the stability of signal transmission is enhanced. Moreover, with the waterproof member sealing the gap between the cover of the tray unit and the main body of the electronic device, the effect of water resistance is also achieved.

Use of ordinal terms such as "first", "second", etc., in the specification and claims to modify a claim element does not by itself connote any priority, precedence, or order of one claim element over another or the temporal order in which acts of a method are performed, but are used merely as labels to distinguish one claim element having a certain name from another element having the same name (but for the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tray unit, movably connected to a main body of an electronic device, comprising:
   a cover, including a protective portion, a connection portion, and a first pivoting portion, wherein the protective portion is exposed to a side of the main body, the connection portion is positioned between the protective portion and the first pivoting portion, and the first pivoting portion protrudes from the connection portion toward a supporting base;
   the supporting base, configured to receive an external card;
   a shaft, pivotally connecting the cover with the supporting base, wherein the supporting base is rotatable with respect to the cover along the shaft; and
   a waterproof member, surrounding the connection portion of the cover, and the waterproof member abuts the main body when the tray unit is combined with the main body of the electronic device.

2. The tray unit as claimed in claim 1, wherein the first pivoting portion has a ladder-shaped structure, and a rotation angle of the supporting base with respect to the cover is restricted by the ladder-shaped structure.

3. The tray unit as claimed in claim 1, wherein the supporting base includes a second pivoting portion and a receiving portion for receiving the external card, and the second pivoting portion is formed on a side of the receiving portion adjacent to the cover, wherein the shaft pivotally connects the first pivoting portion with the second pivoting portion.

4. The tray unit as claimed in claim 3, wherein the shaft pivotally connects the first pivoting portion with the second pivoting portion along an extension direction of a side of the supporting base.

5. The tray unit as claimed in claim 3, wherein the second pivoting portion forms a recess, and the recess is depressed toward the receiving portion and configured to receive the first pivoting portion.

6. The tray unit as claimed in claim 5, wherein the cover further includes a plurality of first pivoting portions, and the second pivoting portion further forms a plurality of recesses for receiving the plurality of first pivoting portions.

7. The tray unit as claimed in claim 5, wherein the first pivoting portion and the recess have T-shaped cross sections.

8. The tray unit as claimed in claim 3, wherein the receiving portion of the supporting base is a substantially rectangular shaped with a hollow.

9. An electronic device, comprising:
a main body ;
a slot, formed on a side of the main body; and
a tray unit, received in the slot, comprising:
   a cover, including a protective portion, a connection portion, and a first pivoting portion, wherein the protective portion is exposed to a side of the main body, the connection portion is positioned between the protective portion and the first pivoting portion, and the first pivoting portion protrudes from the connection portion toward a supporting base;
   the supporting base, configured to receive an external card;
   a shaft, pivotally connecting the cover with the supporting base, wherein the supporting base is rotatable with respect to the cover along the shaft; and
      a waterproof member, surrounding the connection portion of the cover, and the waterproof member abuts the main body when the tray unit is combined with the main body of the electronic device.

10. The electronic device as claimed in claim 9, wherein the first pivoting portion has a ladder-shaped structure, and a rotation angle of the supporting base with respect to the cover is restricted by the ladder-shaped structure.

11. The electronic device as claimed in claim 9, wherein the supporting base includes a second pivoting portion and a receiving portion for receiving the external card, and the second pivoting portion is formed on a side of the receiving portion adjacent to the cover, wherein the shaft pivotally connects the first pivoting portion with the second pivoting portion.

12. The electronic device as claimed in claim 11, wherein the shaft pivotally connects the first pivoting portion with the second pivoting portion along an extension direction of a side of the supporting base.

13. The electronic device as claimed in claim 11, wherein the second pivoting portion forms a recess, and the recess is depressed toward the receiving portion and configured to receive the first pivoting portion.

14. The electronic device as claimed in claim 13, wherein the cover further includes a plurality of first pivoting portions, and the second pivoting portion further forms a plurality of recesses for receiving the plurality of first pivoting portions.

15. The electronic device as claimed in claim 13, wherein the first pivoting portion and the recess have T-shaped cross sections.

16. The electronic device as claimed in claim 11, wherein the receiving portion of the supporting base is a substantially rectangular shaped with a hollow.

* * * * *